(12) United States Patent
Seifermann

(10) Patent No.: US 9,993,880 B2
(45) Date of Patent: Jun. 12, 2018

(54) TOOL HOLDER

(71) Applicant: Simtek AG, Moessingen (DE)

(72) Inventor: Norbert Seifermann, Bodelshausen (DE)

(73) Assignee: Simtek AG, Moessingen (DE)

( * ) Notice: Subject to any disclaimer, the term of this patent is extended or adjusted under 35 U.S.C. 154(b) by 86 days.

(21) Appl. No.: 14/829,894

(22) Filed: Aug. 19, 2015

(65) Prior Publication Data

US 2016/0052062 A1 Feb. 25, 2016

(30) Foreign Application Priority Data

Aug. 20, 2014 (DE) .................. 10 2014 111 898

(51) Int. Cl.
*B23B 31/20* (2006.01)

(52) U.S. Cl.
CPC ........ *B23B 31/201* (2013.01); *B23B 2231/24* (2013.01); *B23B 2260/106* (2013.01); *B23B 2260/138* (2013.01); *Y10T 279/17299* (2015.01); *Y10T 279/17504* (2015.01)

(58) Field of Classification Search
CPC ............. B23B 31/201; B23B 2260/138; Y10T 279/17299; Y10T 279/17504; Y10T 279/17923
See application file for complete search history.

(56) References Cited

U.S. PATENT DOCUMENTS

| | | | | | |
|---|---|---|---|---|---|
| 509,851 | A | * | 11/1893 | Britton | B23B 31/202 279/42 |
| 753,241 | A | * | 3/1904 | Davidson | B23B 31/202 279/42 |
| 815,758 | A | * | 3/1906 | Starrett | B25B 23/101 279/42 |
| 923,041 | A | * | 5/1909 | Garretson | B23B 31/202 279/42 |
| 1,615,233 | A | * | 1/1927 | Redinger | B23B 31/11 279/42 |
| 1,702,810 | A | * | 2/1929 | Buhr | B23B 31/083 279/16 |
| 1,800,118 | A | * | 4/1931 | Dean | B43L 23/08 15/105.53 |

(Continued)

FOREIGN PATENT DOCUMENTS

| | | |
|---|---|---|
| DE | 44 10 414 A1 | 10/1994 |
| JP | 2006 142428 A | 6/2006 |

OTHER PUBLICATIONS

Din 13-1, "Metrisches ISO-Gewinde allgemeiner Anwendung, Teil 1: Nennmasse fuer Regelgewinde Gewinde-Nenndurchmesser von 1 mm bis 68 mm," Nov. 1999, pp. 1-5.
Din En Iso 6892-1, "Metallische Werkstoffe—Zugversuch—Teil 1: Pruefverfahren bei Raumtemperatur (ISO 6892-1:2009); Deutsche Fassung EN ISO 6892-1:2009," Dec. 2009, total pp. 81.
European Search Report Dated Feb. 4, 2016 in European Application No. 15 18 1605.5-1709 with English translation of the relevant parts.

(Continued)

*Primary Examiner* — Eric A Gates
(74) *Attorney, Agent, or Firm* — Collard & Roe, P.C.

(57) ABSTRACT

A tool holder includes a basic body, in which a tool receiving region is located, a circular cylindrical clamping chuck having several joints and an external thread which has an external pitch angle, as well as a union nut having an internal thread which has an internal pitch angle. The union nut has a stopping face on the basic body or on the clamping chuck. The external pitch angle is different from the internal pitch angle.

11 Claims, 3 Drawing Sheets

(56) References Cited

U.S. PATENT DOCUMENTS

| | | | | |
|---|---|---|---|---|
| 2,391,671 | A * | 12/1945 | Berg | B23G 5/12 |
| | | | | 192/45.005 |
| 2,869,237 | A * | 1/1959 | Berge | B43L 9/04 |
| | | | | 279/42 |
| 2,989,315 | A * | 6/1961 | Harrist | B23D 73/00 |
| | | | | 279/42 |
| 3,777,356 | A * | 12/1973 | Hemingway | B25B 13/50 |
| | | | | 279/7 |
| 5,137,288 | A * | 8/1992 | Starkey | A61M 25/09 |
| | | | | 279/42 |
| 5,439,005 | A * | 8/1995 | Vaughn | A61B 17/1633 |
| | | | | 279/42 |
| 5,498,109 | A | 3/1996 | Mine et al. | |
| 5,738,472 | A * | 4/1998 | Roopnarine | F16B 39/30 |
| | | | | 411/309 |
| 6,508,475 | B1 | 1/2003 | Strodtman et al. | |
| 9,140,292 | B2 * | 9/2015 | Lu | F16B 39/28 |
| 2015/0202690 | A1 * | 7/2015 | Haimer | B23B 31/1115 |
| | | | | 279/99 |
| 2015/0217380 | A1 * | 8/2015 | Haimer | B23B 31/005 |
| | | | | 279/99 |

OTHER PUBLICATIONS

Erik Oberg et al., Machinery's Handbook 29th Edition, 2012, pp. 1802-1812, Industrial Press, Inc., New York, New York.

Danielle Collins, Examining screws from three different angles, published online May 25, 2016, downloaded on Jan. 30, 2018 from https://www.linearmotiontips.com/examining-screws-three-different-angles/.

* cited by examiner

TOOL HOLDER

CROSS REFERENCE TO RELATED APPLICATIONS

Applicant claims priority under 35 U.S.C. § 119 of German Application No. 10 2014 111 898.7 filed Aug. 20, 2014, the disclosure of which is incorporated by reference.

BACKGROUND OF THE INVENTION

1. Field of the Invention

The present invention relates to a tool holder which enables the torsion-proof receipt of a cutting insert.

2. Description of the Related Art

Clamping chucks serve for fastening insertion tools such as drills or cutting inserts onto tool carriers. Various designs of tool carriers having clamping chucks are known, in which the clamping chucks have a bolt thread onto which a union nut is screwed. It is therefore known to provide a tapered clamping chuck onto which a union nut is screwed, said union nut having such dimensions that it does not butt against a basic body of the tool carrier. The tool carrier hereby has collars which are not covered by the nut, which weakens it with respect to deflection and vibration damping. Also, no optimal pressure distribution is achieved during actuation of a tool clamped into the clamping chuck. In fact, the strongest forces act on the conical part of the clamping chuck.

Moreover, it is known to dispense with the tapering of the clamping chuck and instead to provide, at its front, a separate component for receiving the tool. For this, the clamping chuck and the union nut must, however, be designed to be very large. By using an additional component, this tool carrier is, in addition, constructed in a more complex manner than the previously described tool carrier.

It is furthermore known, in a tool carrier having a clamping chuck and union nut, to fix the tool in a tool receiver by means of a ring surrounding the tool. However, the tool hereby has a large amount of lateral play.

Finally, clamping methods by means of hydro expansion chucks or shrink chucks are known. These methods provide low deflection and good vibration damping. They are therefore particularly suitable for precision work. However, the tool exchange in a shrink chuck is highly laborious and hydro expansion chucks are very costly to produce.

The object of the present invention is to provide a tool holder which enables torsion-proof fastening of a tool with low deflection and good vibration damping, and which has a simple construction.

SUMMARY OF THE INVENTION

This object is solved by the tool holder according to the invention. This has a basic body in which a tool receiving region is located. It furthermore has a circular cylindrical clamping chuck having several joints and an external thread which has an external pitch angle. According to the invention, circular cylindrical is understood to be a non-conical shape of the clamping chuck, which also has no conical subsections. Finally, it has a union nut having an internal thread which has an internal pitch angle. The external pitch angle is different from the internal pitch angle. The union nut has a stopping face (or locating surface) on the basic body or on the clamping chuck. Here, according to the invention, a stopping face is understood to be a face which runs orthogonally to the longitudinal axis of the basic body and against which the union nut butts when screwed onto the circular cylindrical clamping chuck. The design of the clamping chuck according to the invention guarantees an even pressure distribution when tightening the union nut.

In order to guarantee that, with a clamping chuck which is sufficiently short for a typical tool to be able to be guided through this into the tool receiver of the basic body, when tightening the union nut, such a large amount of pressure is able to be exerted onto the tool that this is held securely in the clamping chuck, the point angle of the thread is at least 60°. It is particularly preferably in the range of 90° to 135°.

The thread pitch of the internal thread of the union nut according to standard DIN 13-1 preferably ranges from 0.75 mm to 1.50 mm. It is hereby prevented that the union nut skips or is released during tightening.

The clamping chuck and the union nut preferably each consist of a material that has an elasticity modulus of at least 180 kN/mm$^2$. It is therefore ensured that a strong tightening of the union nut is possible without the risk hereby arising that the union nut or the clamping chuck becomes permanently deformed or breaks. The elasticity modulus can be determined according to the standard EN ISO 6892-1.

In order to prevent twisting of a tool which is introduced in the tool receiver region during tightening of the union nut, the basic body preferably has a channel for receiving a positioning pin which cuts the tool receiving region orthogonally with respect to the longitudinal axis of the basic body. The bevelled end of a tool introduced into the tool receiving region may butt against this positioning pin, whereby it is fixed in its correct position and torsion-proof in the tool receiving region.

In a preferred embodiment of the tool holder according to the invention, the stopping face is located on the end of the basic body facing towards the clamping chuck. In this embodiment, the external pitch angle is particularly preferably smaller than the internal pitch angle, in order to enable a further tightening of the union nut by clamping the clamping chuck after a butting of the union nut against the stopping face. For this, the external pitch angle is particularly preferably in the range of 99.7% to 99.9% of the internal pitch angle.

In another preferred embodiment of the tool holder, the stopping face is located on the end of the clamping chuck facing away from the basic body. In this embodiment, it is particularly preferred for the external pitch angle to be greater than the internal pitch angle. This enables a clamping of the clamping chuck by further tightening of the union nut after this has butted against the stopping face. For this, it is of utmost preference for the external pitch angle to be in the range of 100.1% to 100.3% of the internal pitch angle.

DETAILED DESCRIPTION OF PREFERRED EMBODIMENTS

Figure 1:
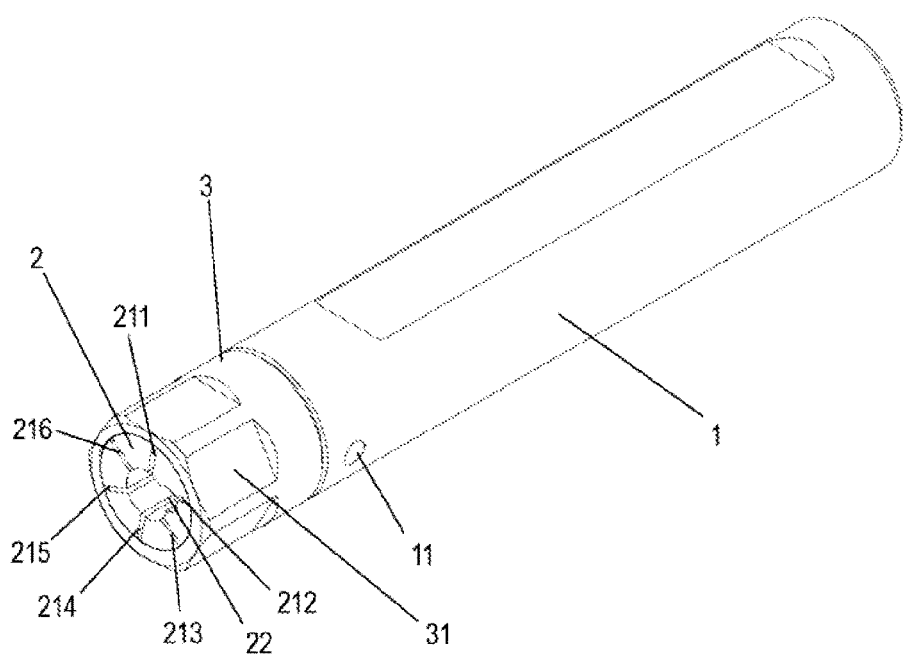
FIG. 1 shows an isometric depiction of a tool holder according to one exemplary embodiment of the invention.
Figure 2:
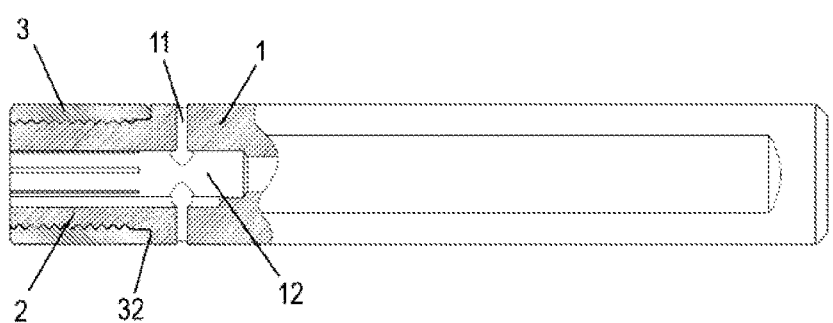
FIG. 2 shows a partially sectional side view of the tool holder according to FIG. 1.
Figure 3:
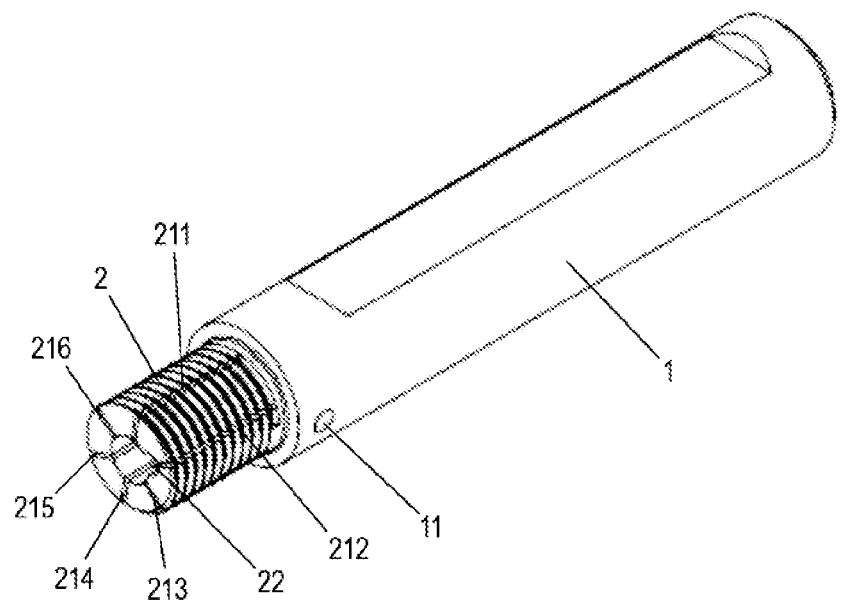
FIG. 3 shows an isometric depiction of the tool holder according to FIG. 1 after removal of its union nut.
Figure 4:
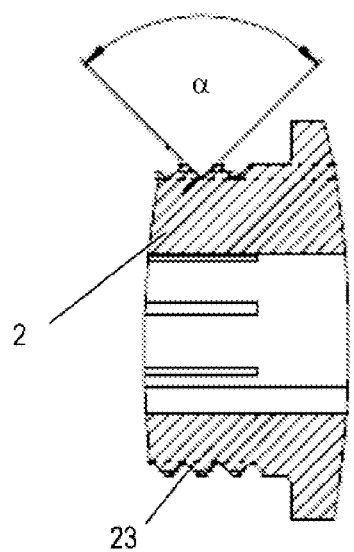
FIG. 4 shows a sectional side view of a detail of the clamping chuck of the tool holder according to FIG. 3.
Figure 5:
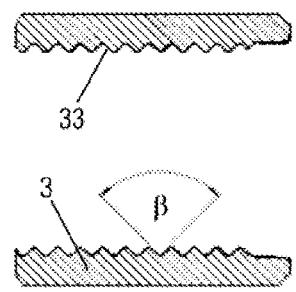
FIG. 5 shows a sectional view of the union nut of the tool holder according to FIG. 1.

A tool holder according to a first exemplary embodiment of the invention is depicted in FIGS. 1 to 3. It has a circular cylindrical basic body 1 having a lateral flattening and a channel 11 running through this orthogonally relative to the longitudinal axis of the basic body 1. A circular cylindrical tool receiving region 12 is located at one end of the basic body 1 in its interior, said region running parallel to the longitudinal axis of the basic body 1 and being cut by the channel 11. A circular cylindrical clamping chuck 2 having six joints 211, 212, 213, 214, 215, 216 is joined to the end of the basic body 1 which has the tool receiving region 12. The clamping chuck 2 has a hollow interior that extends along its longitudinal axis and ends in the tool receiving region 12 of the basic body 1. A coolant supply 22 which also extends up to the basic body 1 runs in parallel to this hollow region and in connection thereto. A tool, such as a completely precision-ground cutting insert which has a bevelled end, can be guided through the clamping chuck 2 into the tool receiving region 12 of the basic body 1. If a positioning pin (not shown) is positioned in the channel 11, the bevelled region of the cutting insert butts against this positioning pin, such that the tool is fixed correctly in its position and the tool is prevented from twisting. To clamp the clamping chuck 2, a union nut 3 is provided which has contact surfaces 31 on its outer side in order to tighten the union nut 3 by means of a spanner. When tightening the union nut 3, this firstly butts against a stopping face 32 which is located on the end of the basic body 1 facing towards the clamping chuck 2. A further tightening of the union nut 3 leads to a clamping of the clamping chuck 2. As is depicted in FIG. 4, the clamping chuck 2 has, for this purpose, an external thread 23 having an external point angle a of 120°. The union nut 3 has, as is depicted in FIG. 5, an internal thread having an inner point angle β of 120° and a thread pitch of 1 mm. When tightening the union nut 3, this enables a high level of force transmission onto the clamping chuck 2. In order to prevent the tool holder from breaking here, the basic body 1, the clamping chuck 2 and the union nut 3 consist of a steel having an elasticity modulus of 195 kN/mm$^2$.

Figure 6:
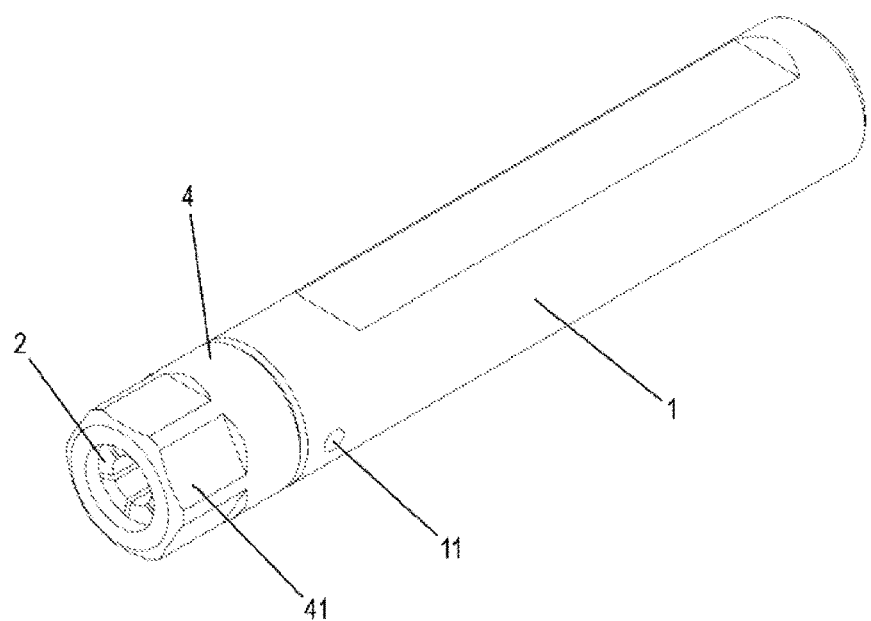
FIG. 6 shows an isometric depiction of a tool holder according to another exemplary embodiment of the invention.
Figure 7:
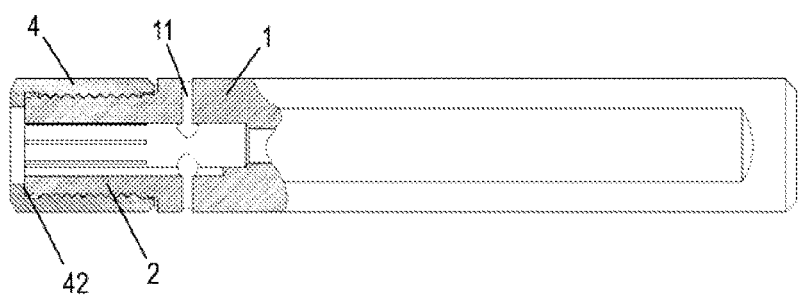
FIG. 7 shows a partially sectional side view of the tool holder according to FIG. 6.

A tool holder according to a second exemplary embodiment of the invention is depicted in FIGS. 6 and 7. Here, the basic body 1 and the clamping chuck 2 are designed to be identical to the first exemplary embodiment of the invention. However, the tool holder of the second exemplary embodiment has a union nut 4 having externally-located contact surfaces 41 which do not butt against the end of the basic body 1 facing towards the clamping chuck 2. Instead, the union nut projects to a centre point, at its end facing away from the basic body 1, and thus forms a stopping face 42 with the end of the clamping chuck 2 which is facing away from the basic body 1. The union nut 4 is sufficiently short for it to butt against this stopping face 42 while being tightened, before it is able to touch the basic body 1. In this second exemplary embodiment of the tool holder according to the invention, a further tightening of the union nut 4 also leads to a clamping of the clamping chuck 2 after butting against the stopping face 42. The internal pitch angle of the union nut 4 of the second exemplary embodiment of the tool holder is, however, only 99.7% to 99.9% of the external pitch angle. Therefore, in contrast to the first exemplary embodiment, it is not greater than the external pitch angle of the external thread 23 of the clamping chuck 2, but rather is smaller than the external pitch angle instead.

Although only a few embodiments of the present invention have been shown and described, it is to be understood that many changes and modifications may be made thereunto without departing from the spirit and scope of the invention.

What is claimed is:

1. Tool holder, having
   a basic body in which a tool receiving region is located,
   a circular cylindrical clamping chuck having a non-conical shape, having no conical subsections, having several joints, and having an external thread which has an external pitch angle, and
   a union nut having an internal thread which has an internal pitch angle,
   wherein the basic body or the clamping chuck has a stopping face configured to stop the union nut,
   wherein the union nut butts against the stopping face when the union nut is screwed onto the clamping chuck, and
   wherein the external pitch angle is different from the internal pitch angle.

2. Tool holder according to claim 1, wherein the external thread has a thread point angle of at least 60°.

3. Tool holder according to claim 1, wherein the internal thread has a thread pitch ranging from 0.75 mm to 1.50 mm.

4. Tool holder according to claim 1, wherein the clamping chuck and the union nut each comprise a material that has an elasticity modulus of at least 180 kN/mm$^2$.

5. Tool holder according to claim 1, wherein the basic body has a channel for receiving a positioning pin, and
   wherein the channel cuts the tool receiving region orthogonally with respect to the longitudinal axis of the basic body.

6. Tool holder according to claim 1, wherein the stopping face is located at the end of the basic body facing towards the clamping chuck.

7. Tool holder according to claim 6, wherein the external pitch angle is smaller than the internal pitch angle.

8. Tool holder according to claim 7, wherein the external pitch angle is in the range of 99.7% to 99.9% of the internal pitch angle.

9. Tool holder according to claim 1, wherein the stopping face is located at the end of the clamping chuck facing away from the basic body.

10. Tool holder according to claim 9, wherein the external pitch angle is greater than the internal pitch angle.

11. Tool holder according to claim 10, wherein the external pitch angle is in the range of 100.1% to 100.3% of the internal pitch angle.

* * * * *